US006666338B1

(12) United States Patent
Henriksson et al.

(10) Patent No.: US 6,666,338 B1
(45) Date of Patent: Dec. 23, 2003

(54) DEVICE FOR THE SEPARATION OF SOLID OBJECTS FROM A FLOWING FLUID

(75) Inventors: Mats Henriksson, Alvkarleby (SE); Anders Lundström, Alvkarleby (SE); Rolf Karlsson, Alvkarleby (SE); Tapio Kaipanen, Kullavik (SE); Johan Westin, Gavle (SE)

(73) Assignee: Vattenfall AB, Stockholm (SE)

( * ) Notice: Subject to any disclaimer, the term of this patent is extended or adjusted under 35 U.S.C. 154(b) by 0 days.

(21) Appl. No.: 09/868,250

(22) PCT Filed: Dec. 2, 1999

(86) PCT No.: PCT/SE99/02251

§ 371 (c)(1),
(2), (4) Date: Sep. 14, 2001

(87) PCT Pub. No.: WO00/35589

PCT Pub. Date: Jun. 22, 2000

(30) Foreign Application Priority Data

Dec. 15, 1998 (SE) ............................................. 9804364

(51) Int. Cl.[7] ............................ B04C 3/04; B01D 21/26

(52) U.S. Cl. .................... 209/725; 209/208; 210/512.1; 210/787; 55/452

(58) Field of Search .......................... 209/17, 208, 209, 209/724, 725; 210/188, 512.1, 787; 55/452, 447, 454, 455

(56) References Cited

U.S. PATENT DOCUMENTS

| | | | | |
|---|---|---|---|---|
| 3,204,696 A | | 9/1965 | De Priester et al. | 166/59 |
| 4,654,061 A | | 3/1987 | Jung | 55/452 |
| 6,143,175 A | * | 11/2000 | Ford et al. | 209/725 X |
| 6,426,010 B1 | * | 7/2002 | Lecoffre et al. | 209/725 X |

FOREIGN PATENT DOCUMENTS

| | | |
|---|---|---|
| EP | 0 162 441 | 11/1985 |

* cited by examiner

*Primary Examiner*—Tuan N. Nguyen
(74) *Attorney, Agent, or Firm*—Young & Thompson

(57) ABSTRACT

A device for the separation of solid objects (9) from fluid flowing in a conduit tube (2) includes a housing that includes a tubular outer wall (3) and a tubular inner wall (4). Between these is delimited a collecting space (8). Concentrically relative to the inner wall (4) is provided a rotation-symmetrical central body (12) which at opposing ends cooperates with flow converting devices (15, 16), which transform incoming flow to a rotative motion and outgoing flow to an axial motion. In the inner wall (4) are recessed tangentially separated holes (20) of elongated shape, through which the scrap objects may pass and be collected in a collecting space (8). In the collecting space (8) a calm flow operation is obtained which guarantees that collected scrap objects are not carried away and returned to the main fluid flow through the separation device.

8 Claims, 7 Drawing Sheets

DEVICE FOR THE SEPARATION OF SOLID OBJECTS FROM A FLOWING FLUID

TECHNICAL FIELD OF THE INVENTION

Figure 1:
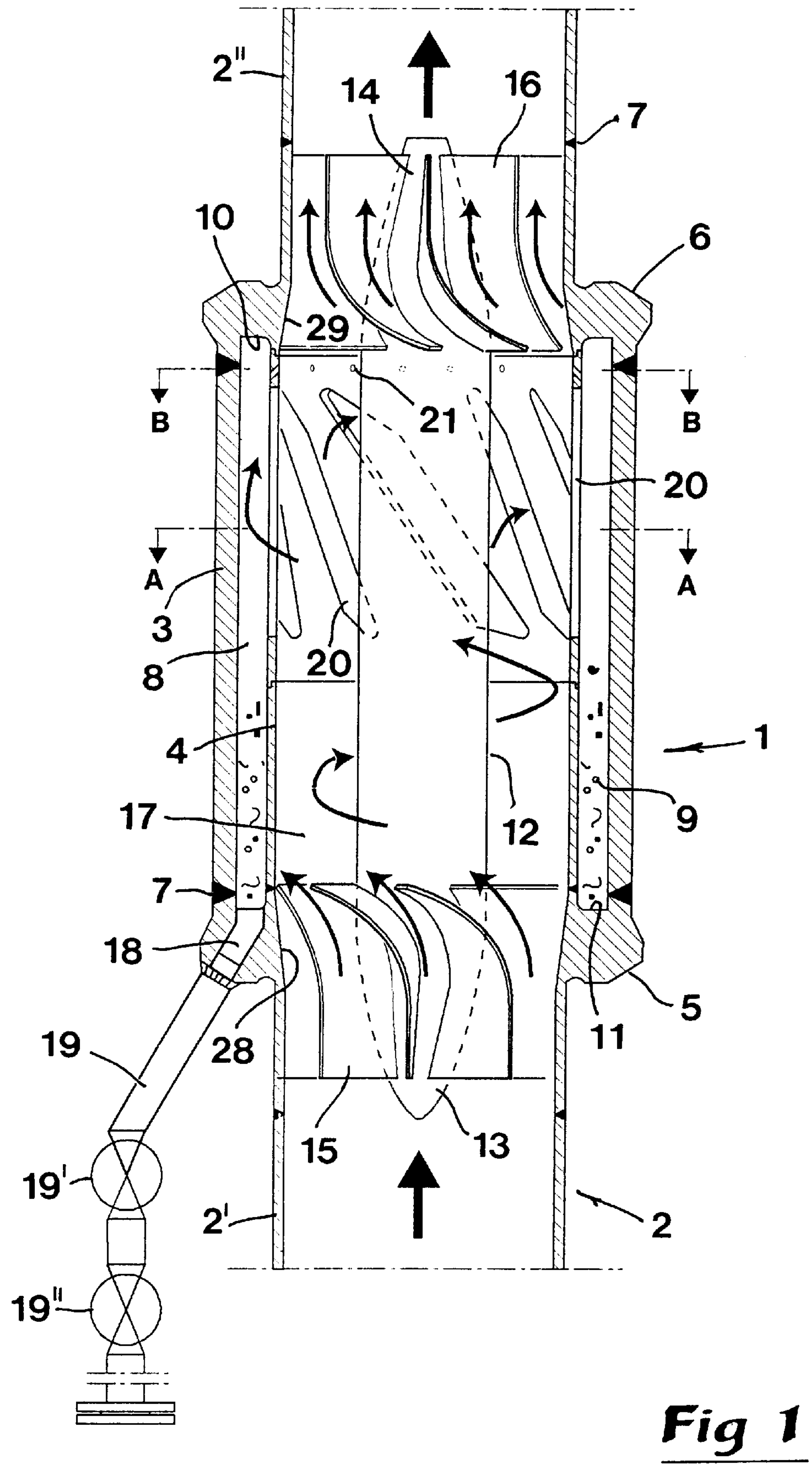

This invention relates to a device for the separation of solid objects from a fluid flowing in a conduit tube, comprising a housing mounted between separate parts of the tube, which housing comprises a tubular outer wall and a tubular inner wall of a rotation-symmetrical basic shape, a ring-shaped collecting space being delimited between said walls, and a central body of a rotation-symmetrical basic shape placed concentrically relative to the inner wall, which central body at an inlet end cooperates with a first fluid converting device having the purpose of transforming an arriving axial fluid flow into a substantially rotating flow in a ring-shaped space between the central body and the inner wall, and at an outlet end cooperates with a second flow converting device with the purpose of transforming the rotating fluid flow in the latter ring space into an outgoing axial flow in the tube part that is located downstream of the housing, the inner wall having passages through which objects of a larger density than the fluid and carried by the fluid may pass radially outwards to be collected in a bottom of the collecting space.

PRIOR ART

A separator device of the type given above has been previously tested for use in nuclear power plants, more precisely in the feed water circuit to nuclear reactors of the boiler type. This arrangement is denominated particle or scrap trap by the men skilled in art. A primary object of the arrangement is to separate solid objects which accidentally have come into the feed water circuit and which may lead to problems in the plant, e.g., clogging of gaps at the control rods of the reactor or in fuel assemblies. The objects in question may be, e.g., screws, nuts, springs or similar, which are of a solid nature and have a larger density than the water. The previously tested separator arrangement is based on the use of a separator housing whose inner wall is formed with a passage with the form of a ring-shaped, circumferential gap. However, a considerable disadvantage of this construction is that the ring gap forms a circumferential interruption in the inner wall, whereby the downstream edge of the gap causes disturbances, such as turbulence and the creation of vortices in the main water flow that passes through the separator arrangement. Also the secondary flow that is taken out via the ring gap is disturbed to a high degree. Thus, rather intense vortex formations and turbulence arise in the collecting space outside the inner wall, which in practice results in that the objects that have been led out into the collecting space, after a shorter or longer period of time are carried away by the water and returned to the main flow. In other words, the capability of the arrangement to separate and keep objects becomes mediocre and occasionally non-existent, primarily with regard to lighter objects.

Further, in EP 0 162 441 a separator device is disclosed which in first hand may be used for the separation of steam from water. Also in this case, the separation takes place via a ring-shaped gap, to which must be added that the device does not comprise any collecting space in which solid objects would be trapped and accumulated.

OBJECTS AND CHARACTERISTICS OF THE INVENTION

The present invention aims at removing the above-mentioned inconveniences of the previously known separator device and creating an improved separator device. A primary object of the invention is to create a separator device that may not only trap the solid objects that are brought by the main flow in an effective way, but also to guarantee that the trapped objects reliably remain in the collecting space during a long time, preferably during the time that goes by between two consecutive reactor revisions. Another object is to create a separator device which, when it is passed by the main fluid flow, does not give rise to flow disturbances, such as vortex formations, turbulence and similar, which in turn may cause detrimental vibrations in the conduit system downstream of the device. A further object of the invention is to create a separator device of a mechanical construction that is as simple as possible, it being possible to mount the device into existing conduit tubes. Yet another object is to create a separator device that does not cause a considerable pressure drop in the main fluid flow when it passes through the device.

According to the invention, at least the primary object is achieved by means of the features that are defined in the characterizing clause of claim 1. Advantageous embodiments of the device according to the invention are further defined in the dependent claims.

BRIEF FURTHER ELUCIDATION OF PRIOR ART

Centrifugal separation devices for general industrial purposes have been previously disclosed in, e.g., U.S. Pat. Nos. 1,931,193, 193, 2,425,110, 2,512,253, 2,616,563, 2,986,278, 4,834,887, EP 0 005 494, EP 0 162 441 and EP 0 267 285. However, none of these devices are based on the use of tangentially separated, elongated holes of the type that characterizes the present invention. For this reason, the previously known devices are not suited for the separation of scrap from the feed water to nuclear reactors.

BRIEF DESCRIPTION OF THE APPENDED DRAWINGS

Figure 2:
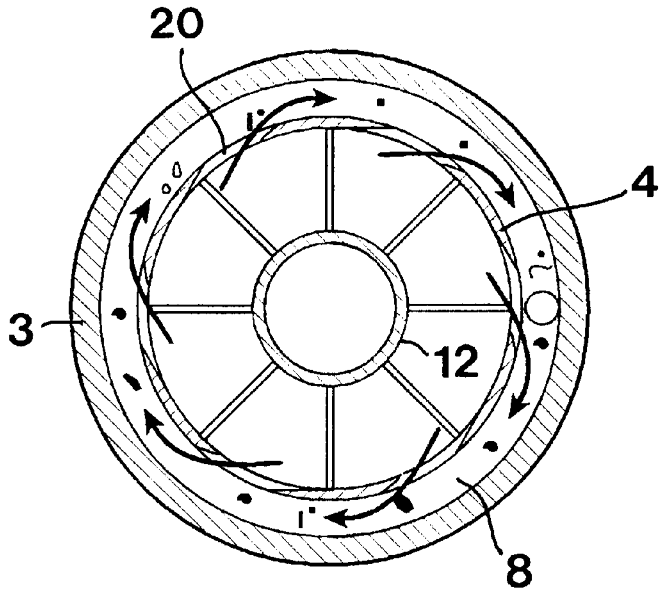
Figure 3:
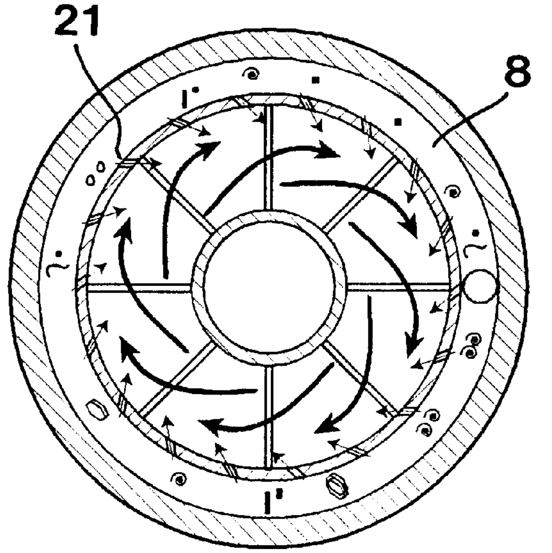
Figure 5:
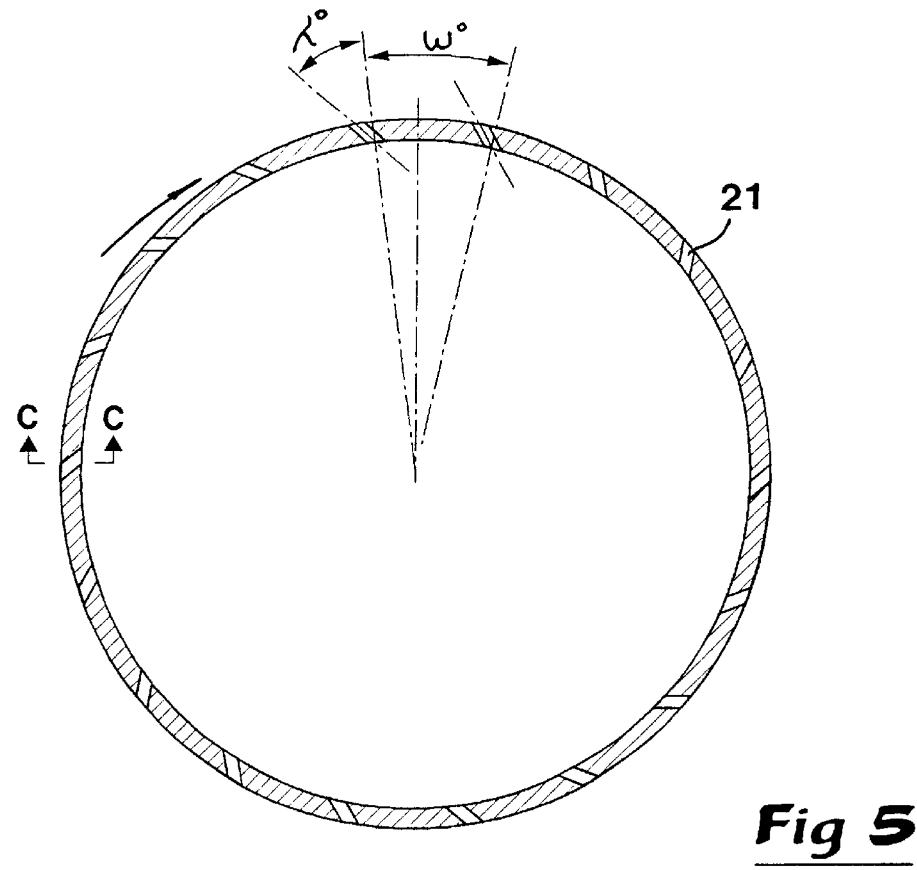
Figure 4:
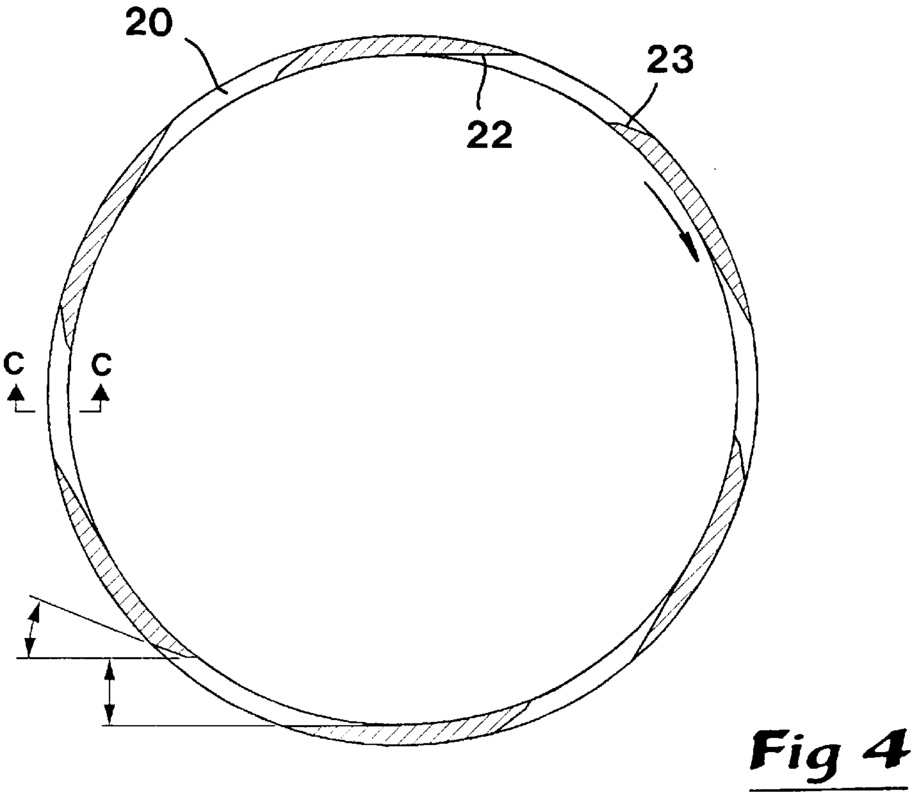
Figure 6:
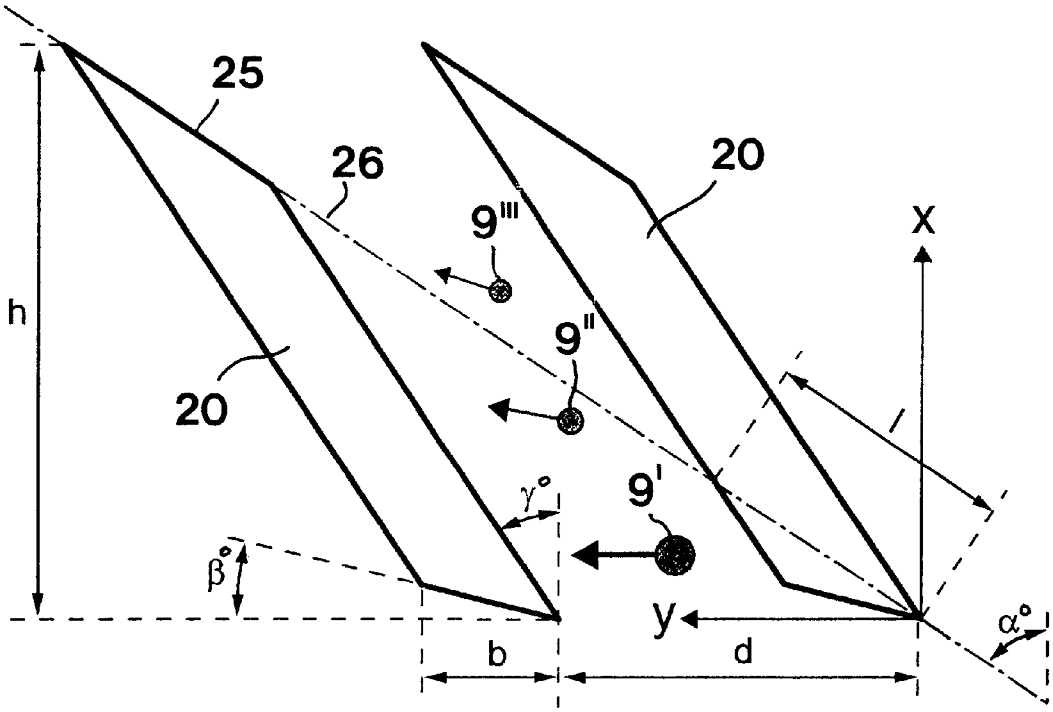
Figure 8:
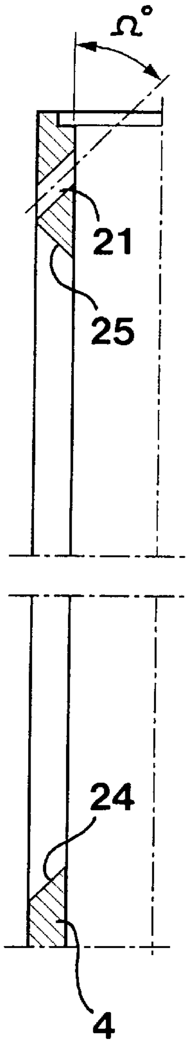
Figure 7:
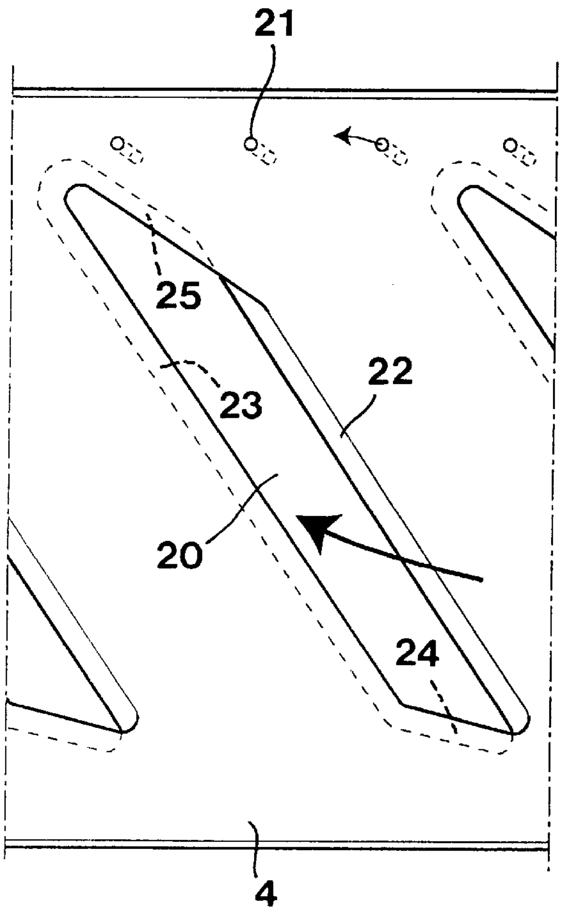
Figure 10:
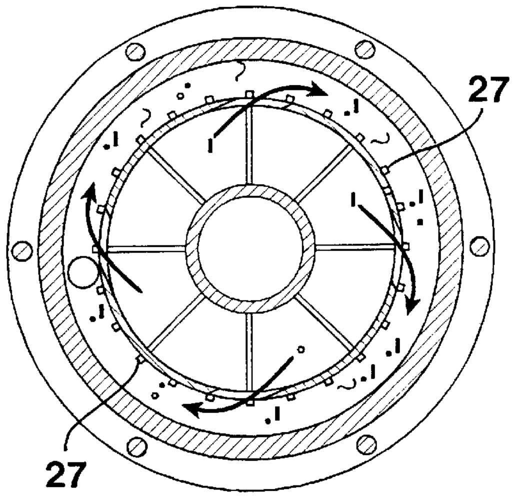
Figure 9:
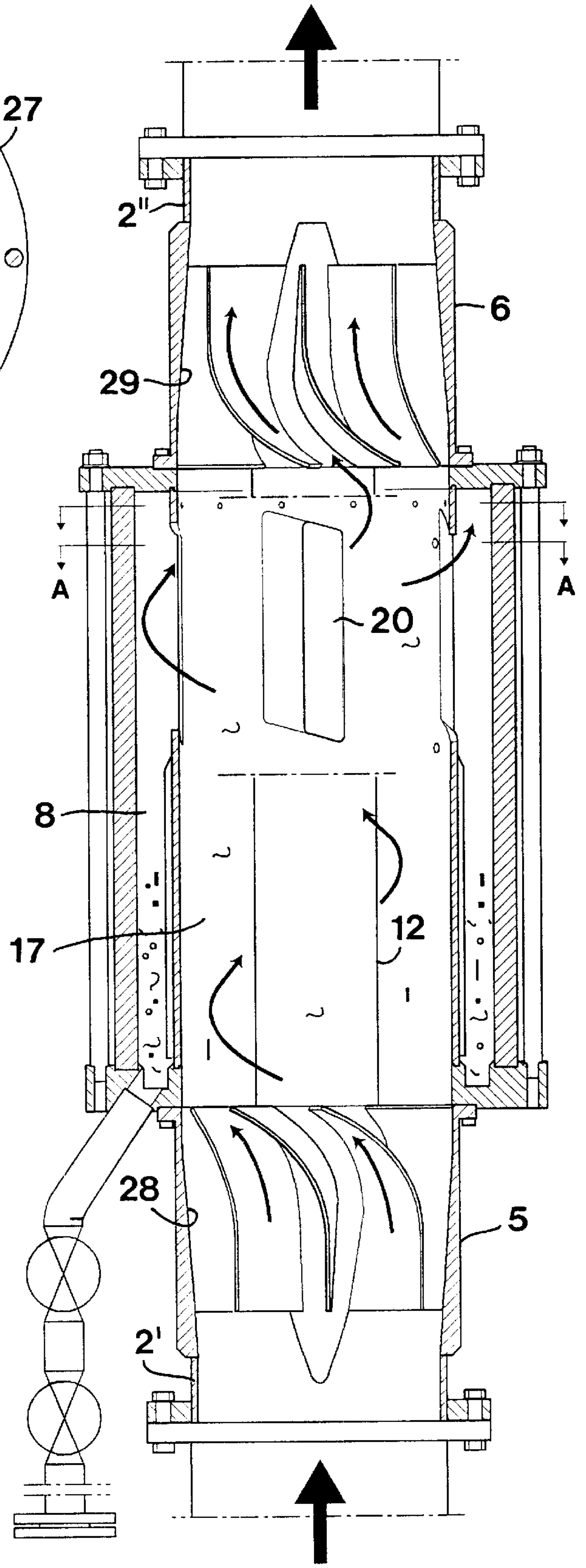
Figure 11:
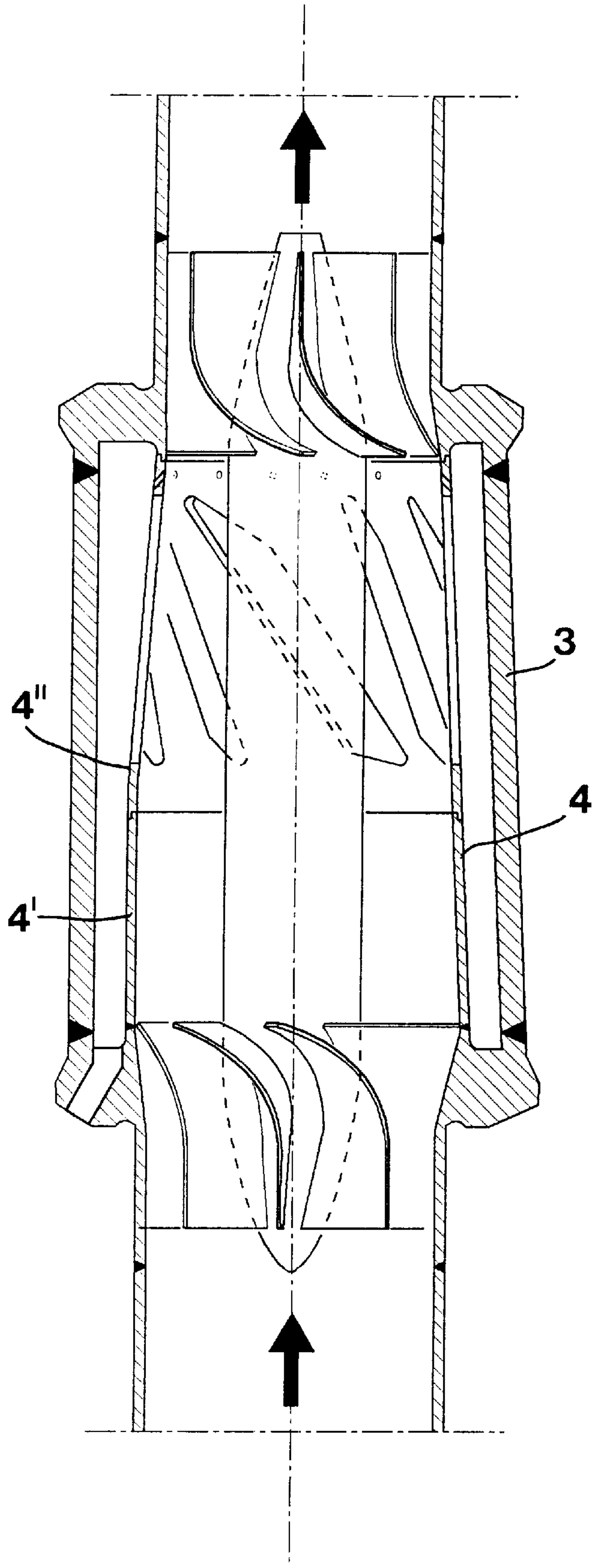

In the drawings:

FIG. 1 is a longitudinal section through a first embodiment of a separation device according to the invention, FIG. 2 is a cross-section A—A in FIG. 1, FIG. 3 is a cross-section B—B in FIG. 1, FIG. 4 is an enlarged cross-section of only one of the inner walls included in the device, more specifically in the section plane A—A in FIG. 1, FIG. 5 is an analogous enlargement of a cross-section through the same inner wall in the section plane B—B in FIG. 1, FIG. 6 is a schematic view illustrating the geometry of two adjacent passage holes in the previously mentioned inner wall, FIG. 7 is an enlarged partial view of the mentioned inner wall in a fictive spread state, as seen from the center, FIG. 8 is an enlarged detail section C—C (see FIGS. 4 and 5) through the same inner wall, FIG. 9 is a section corresponding to FIG. 1, showing a second alternative embodiment of the device according to the invention, FIG. 10 is a cross-section A—A through the separation device according to FIG. 9, and FIG. 11 is a section showing a third and a fourth embodiment of the invention.

DETAILED DESCRIPTION OF PREFERRED EMBODIMENTS OF THE INVENTION

In FIG. 1, reference numeral 1 designates generally a separation device according to the invention, which is mounted in a water conduit tube 2, more specifically between a first tube part 2' at the upstream side of the device, and a second tube part 2" at the downstream side of the device. As illustrated by the two stout axial arrows, the water flow passes through the conduit tube in a direction from below and upwards, the tube being most advantageously vertically oriented, although an oblique mounting also is feasible.

The separation device 1 includes a housing that comprises a tubular outer wall 3 and an equally tubular inner wall 4. At least the inner wall 4—but advantageously also the outer wall 3—has a rotation-symmetrical basic shape. More specifically, according to the example in FIG. 1, the two walls are cylindrical. Each one of the walls is connected to specific end pieces 5, 6, which in turn are connected to the two tube parts 2' and 2". As indicated in the drawings, said details may be inter-connected by weldings 7, although also other connection alternatives are feasible. Between the two walls 3, 4 is delimited a ring-shaped, circumferential space 8. This space has the purpose of receiving and collecting solid scrap objects 9 that are separated from the main water flow in the tube conduit. Therefore, hereinafter this space will be denominated collecting space. Upwardly, this collecting space is delimited by an upper surface 10 provided in the upper end piece 6. Downwardly, the space is delimited by a bottom surface 11 provided in the lower end piece 5. The scrap objects 9 that are received in the collecting space sink by their own weight down to the bottom surface 11 and are accumulated there.

Within the housing is provided a centrally placed body 12 with a rotation-symmetrical basic shape. This central body is concentrical with the inner wall 4 and may have a diameter within the range of 50 to 70% of the diameter of the inner wall. The body is elongated and has a central axis that coincides with the central axis of the main tube conduit 2. At its upstream end, the central body 12 has a tapering end part 13 of a rotation-symmetrical form, which ends in a pronounced apex. The envelope surface of the end part 13 is substantially conical, although with a slightly vaulted form. At its down-stream end, the central body 12 has a second end part 14 which, like the first end part, has a rotation-symmetrical tapering form. However, in this case the envelope surface is advantageously genuinely conical, and the end part ends in a planar gable surface instead of an apex.

In this context it should be pointed out that the terms "upper" and "lower" are to be kept separate from the terms "upstream" and "downstream", respectively. Thus, due to the fact that the water flows in a direction upwardly through the conduit tube 2, all "upper" details in the device are located at its downstream end and vice versa.

Flow converting devices 15, 16 cooperate with each one of the ends of the central body 12. Of these two devices, the upstream device 15 functions as a rotation generator, which has the purpose of transforming an axially arriving water flow into an at least partly rotating flow in the ring-shaped space designated 17 between the outside of the central body 12 and the inside of the inner wall 4. The device 15 consists of a set of separate blades, which at their upstream ends are substantially planar, to be gradually bent (in several planes) in the direction of their downstream ends. When the axial main water flow coming from below arrives at the set of blades, then the water will be guided off laterally in a progressive way and be submitted to a rotating motion that involves that the water, by the centrifugal force, is pressed outwardly towards the inside of the inner wall 4.

The second flow converting means 16 also consists of a set of separate blades. However, these blades are shaped with bent upstream portions, which gradually transpose into substantially planar downstream portions. Therefore, when the rotating water flow arrives to this set of blades, the flow is transformed into a substantially axial flow.

In practice, the blades in said devices 15, 16 also serve as means for fixing the central body 12. More specifically, each blade is welded to the outside of the central body and the inside of the conduit tube 2, respectively, along opposing longitudinal edges.

Moreover, it should be pointed out that the lower end-piece 5 located upstream, comprises an outflow 18 for the evacuation of collected scrap, preferably in connection with a revision of the nuclear reactor. The outflow 18 is advantageously connected to an evacuation conduit 19 with valves 19', 19" for removal of the scrap objects under controlled conditions. In operation, i.e., during the whole period between two consecutive reactor revisions, the valves are shut in order to reliably keep the scrap objects accumulated on the bottom of the collecting space. The bottom surface 11 of the collecting space 8 may slope relative to the horizontal plane and have its lowest point located at the outflow 18.

According to a feature that is characteristic for the invention, the required passages or openings for the withdrawal of scrap objects from the main liquid flow into the collecting space 8 consist of a set of tangentially separate holes 20 of elongated shape. These holes may be placed in the same section of the inner wall, as far as all upstream ends of the holes are located in a common horizontal cross-sectional plane, at the same time as the downstream ends of the holes are located in a common horizontal cross-sectional plane at a lower level. However, adjacent holes may also be axially displaced relative to each other. The number of holes 20 as such may vary, but should lie within the range of 3 to 8. In the shown preferred embodiment, the number of holes amounts to six. As may be clearly seen in FIG. 1, the holes 20 are provided only in the upper part (about the upper half) of the inner wall 4, while the lower part (about the lower half) of the inner wall is closed, in so far as it lacks holes or openings.

In FIG. 1, 21 designates a number of fine canals, which have the purpose of achieving a restricted return water flow from the collecting space 8 back into the main water flow. These canals 21 are placed in a common cross-sectional plane in the region between the hole set 20 and the other flow converting device 16. In practice, the canals 21 may have a cylindrical shape with a diameter within the range of 6 to 10 mm. Most advantageously, the canals have a diameter of about 8 mm.

Reference is now also made to the drawing FIGS. 2 to 8 that illustrate different details of the embodiment of the device shown in FIG. 1. In FIGS. 2 and 3 it may be seen that the central body 12 may consist of a cylindrical tube. In practice, this tube is connected to end parts 13, 14 (see FIG. 1) of a solid, strong construction. Further, by the arrows in FIG. 2 may be seen how the rotating, screw-shaped main water flow through the separation housing in the example is thought to move clockwise in a plane, as observed from above. Since the water is pressed outwards towards the inside of the inner wall 4 by the centrifugal force, a certain amount of the flow will be guided off into the collecting space 8, whereby the scrap objects that are carried by the water and that have a larger density than the water, will be flung out radially and tangentially through the holes 20. By the provision of the canals 21 downstream of the holes 20, also a certain axial speed component is conferred to the secondary flow entering the collecting space 8. However, on account of the fact that the canals 21 are diminutive, this secondary flow is restricted to a large extent. In relation to the intense axial main water flow, which in the case of feed water may have a velocity of about 10 m/s or more, the water in the collecting space 8 may therefore be regarded as approximately stationary, although slightly rotating. In FIG. 3, the moderate secondary flow or return water flow from the collecting space 8 to the main liquid is indicated by means of small, inwardly directed arrows.

In FIG. 4 may be seen, on one hand, how the number of holes 20 amounts to six, and, on the other hand, how the edge surfaces of the holes are advantageously obliquely bevelled. More specifically, in FIG. 4 is shown how the hole edge surface 22 along one longitudinal side edge of an individual hole extends uninterrupted at a comparatively flat angle (e.g., within the range 0 to 10°) relative to an imaginary tangent on the envelope surface of the inner wall 4, while the opposing hole edge surface 23 extends at a steeper angle (e.g., 20 to 40°) to an imaginary tangent. The hole edge surface 22 is located upstream, as regarded in the tangential direction, while the hole edge surface 23 is located downstream, as may be seen by the arrow in FIG. 4. It should be noted that the surface 23 in the immediate proximity of its uptstream edge is broken at a certain angle.

In FIG. 5 may be clearly seen how the number of return flow canals 21 amounts to eighteen. On account of this, the pitch angle W amounts to 20°. Furthermore, in FIG. 5 may be seen how the individual canal is oblique by an angle λ in relation to an imaginary radial plane. In practice, this angle λ may amount to about 45°. As may be seen in FIG. 8, the individual canal 21 is oblique also axially, by an angle Ω. Also this angle Ω may advantageously amount to 45°. More specifically, the canal 21 is oblique in such a way that its external opening is located upstream of the internal opening, as seen in the direction of the main liquid flow.

Further, in FIG. 7 may be seen how not only the hole edge surfaces 22 and 23 along the longitudinal edges of the hole are obliquely bevelled, but also the hole edge surfaces 24 and 25 at the two opposing short ends of the hole. As may be seen in FIG. 8, the two hole edge surfaces 24, 25 diverge in a direction outwardly relative to each other. In this way, a good water-clearance is guaranteed at the upstream end of the hole in connection with the hole edge surface 24, and the water flow will be effectively cut by the sharp edge in connection with the hole edge surface 25 located downstream. The same effect is obtained by the obliquely bevelled longitudinal edge surfaces 22, 23, of which the former guarantees that the tangentially arriving water smoothly follows the surface, while the sharp edge adjacent the hole edge surface 23 effectively cuts through the arriving water flow.

In FIGS. 6 and 7 are shown the inner wall 4 and the appurtenant holes 20 in an imaginary, planarly spread state. Although the shape and placing of the holes 20 may vary, in the shown example is shown a placing that is oblique in relation to the longitudinal axis of the separation housing, the individual hole being substantially shaped as a parallelogram, however with the exception that the opposing short side edges of the hole are not absolutely parallel (which is the case with the long side edges).

The inner wall 4 may have an outer diameter within the range 400 to 500 mm, e.g. 450 mm, and the wall thickness may Lie within the range 5 to 10 mm. The height or level difference designated “h” in FIG. 6, between the diametrically opposed corners of the individual hole, then amounts to 300 to 450 mm, e.g. 380 mm, and the width designated “b” of the lower short side edge surface (in the projection plane) may amount to 60 to 100 mm, e.g. 83 mm. In practice, the different holes 20 are equi-distantly separated, and the pitch distance “d” may amount to 200 to 250 mm, e.g. 235 mm. The inclination angle β between the lower short side edge surface of the individual hole and an imaginary horizontal plane may amount to 10 to 20°, for instance 15°. The inclination angle γ may amount to 20 to 40°. In the concrete example, the angle is 30°. However, both these angles may vary upwardly and downwardly. In particular, the angle y may be reduced towards zero. Thus, in an extreme case, as exemplified in FIG. 9, the holes may be located axially in the inner wall.

As may be further seen in FIG. 6, an imaginary extension 26 of the upper short side edge 25 of the hole extends through the lowermost corner of each adjacent hole. The inclination angle a between the longitudinal axis “x” of the separation device and the extension line 26 or the upper short side edge surface, respectively, may amount to about 50°, although deviations upwards as well as (primarily) downwards from this value are feasible.

In FIG. 6 three differently heavy scrap objects are designated 9', 9" and 9'", respectively, of which the heaviest 9' is submitted to the largest centrifugal force. This involves that this object is flung outwards at a comparatively flat angle of the motion vector. The somewhat lighter object 9" moves tangentially outwards at a larger angle, in that this object is not equally strongly influenced by the centrifugal force. The lightest object 9'" moves at a still steeper angle, i.e., here the axial motion vector is larger than the corresponding vector for heavier objects. However, also this motion takes place at an angle that is smaller than the above-mentioned angle a. By the shown geometry, long trajectories are obtained for a given hole area. By the fact that portions of the inner wall 4 are between pairs of adjacent holes, the main water flow through the space 17 may partly support against the wall in connection with the holes having been passed; something that contributes to a high degree to stabilizing the flow and counteract disturbances in it.

In FIGS. 9 and 10 an alternative embodiment is illustrated, according to which the individual, elongated holes 20 are internally parallel and axially oriented. Also in this case, the holes may have a parallelogram-like shape. Furthermore, according to this embodiment, bars or rods 27 on the outside of the inner wall 4, more specifically on that part of the wall that is located upstream (i.e., below) the holes 20. The rails may be straight and equi-distantly separated and extend axially. The height of the rails may be limited (e.g., within the range of 5 to 10 mm). By the provision of these rails, possibly occurring rotational motion in the liquid mass in the collecting space 8 may be braked in order to improve the capability of the collecting space to keep scrap objects. Albeit such rails have been illustrated only in FIGS. 9 and 10, these may advantageously also be used for the other embodiments.

Referring to the embodiment according to FIG. 1, as well as the embodiment according to FIG. 9, it should be noted that both inner walls 4 are cylindrical and have a diameter that is larger than the diameter of the tube parts 2', 2". More specifically, the diameter of the inner wall 4 is so much larger than the diameter of the tube parts 2, 2' that the cross-sectional area of the annular space 17 (i.e., the cross-sectional area of the inner wall reduced by the cross-sectional area of the central body 12) is about equally large as, or possibly somewhat smaller than the cross-sectional area of the tube parts 2', 2". Also this contributes to a more undisturbed liquid flow through the space. Moreover, it may be pointed out that the two end pieces 5, 6 of the housing have conically tapering inner surfaces 28, 29, which guarantee a uniform and stable liquid transfer between the conduit tube and the ring-shaped space 17. It is notable that these conical surfaces are located in level with the two conically tapering end parts 13, 14 of the central body.

Reference is now made to FIG. 11, which in one and the same picture illustrates two different, further embodiments of the invention. On the left side of the central axis is exemplified how the inner wall 4 comprises not only a cylindrical part 4', but also a conically tapering part 4". The cylindrical part 4' is located upstream of the conical part 4". By the fact that the diameter of the inner wall is reduced in the region downstream of the cylinder wall 4', a further stabilization of the flow is achieved, while maintaining or increasing the tangential motion component of the scrap objects.

To the right of the central line, an embodiment is illustrated, according to which the inner wall 4 in its entirety is conically shaped. More specifically, the wall 4 converges in the downstream direction (as well as the conical wall part 4"), which may also be the case with the outer wall 3.

Feasible Modifications of the Invention

The invention is not restricted solely to the embodiments as described above and shown in the drawings. Thus, it is feasible to apply the invention in connection with other fluids than just water, e.g., other liquids or even gaseous fluids. Furthermore, the geometry of the details included in the device may be modified in a variety of ways, within the frame of the appended claims.

What is claimed is:

1. A device for the separation of solid objects from a fluid flowing in a conduit tube (2), comprising a housing mounted between separate parts of the tube (2', 2"), which housing comprises a tubular outer wall (3) and a tubular inner wall (4) of a rotation-symmetrical basic shape, a ring-shaped collecting space (8) being delimited between said walls, and a central body (12) of a rotation-symmetrical basic shape placed concentrically relative to the inner wall (4), which central body at an inlet end cooperates with a first fluid converting device (15) having the purpose of transforming an arriving axial fluid flow into a substantially rotating flow in a ring-shaped space (17) between the central body (12) and the inner wall (4), and at an outlet end cooperates with a second flow converting device (16) with the purpose of transforming the rotating fluid flow into an outgoing axial flow in the tube part downstream of the housing, the inner wall (14) having passages through which objects (9) of a larger density than the fluid and carried by the fluid may pass radially outwards to be collected in a bottom (11) of the collecting space (8), characterized in that said passages consist of a set of tangentially separated holes (20) of elongated shape, which are placed at a distance from said bottom (11) in a part of the inner wall (4) located downstream, while a part of this wall located upstream lacks such holes.

2. Device according to claim 1, characterized in that the individual hole (20) in the inner wall (4) is axially oriented.

3. Device according to claim 1, characterized in that the individual hole (20) in the inner wall (4) is oblique relative to the longitudinal axis of the housing.

4. Device according to claim 1, characterized in that the individual hole (20) in the inner wall (4) has a parallelogram-like shape.

5. Device according to claim 1, characterized in that edge surfaces (22, 23, 24, 25) delimiting the individual hole (20) are obliquely bevelled.

6. Device according to claim 1, characterized in that in the part of the inner wall (4) that is located downstream of the set of holes (20) is a plurality of fine canals (21) for achieving a restricted return fluid flow from the collecting space (8) back into the main fluid flow in the conduit tube (2).

7. Device according to claim 6, characterized in that the individual return fluid canal (21) is inclined, not only relative to the axial extension of the inner wall (4), but also relative to its tangential extension.

8. Device according to claim 1, characterized in that the elongated holes (20) are placed in one and the same section of the part of the inner wall (4) located downstream.

* * * * *